(12) United States Patent
Zheng et al.

(10) Patent No.: US 8,970,555 B2
(45) Date of Patent: Mar. 3, 2015

(54) OPTICAL TOUCH PANEL AND BRIGHTNESS CONTROL METHOD THEREOF

(71) Applicant: AU Optronics Corp., Hsin-Chu (TW)

(72) Inventors: Zao-Shi Zheng, Hsinchu (TW); Chun Chang, Hsin-Chu (TW); Po-Yu Kuo, Hsin-Chu (TW); An-Thung Cho, Hsin-Chu (TW); Jiun-Jye Chang, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 137 days.

(21) Appl. No.: 13/782,224

(22) Filed: Mar. 1, 2013

(65) Prior Publication Data

US 2014/0092068 A1    Apr. 3, 2014

(30) Foreign Application Priority Data

Sep. 28, 2012  (TW) .............................. 101135935 A

(51) Int. Cl.
*G06F 3/042*    (2006.01)
*G06F 3/03*    (2006.01)

(52) U.S. Cl.
CPC .................. *G06F 3/0304* (2013.01)
USPC ........................................... 345/175; 345/173

(58) Field of Classification Search
CPC ............... G06F 3/0304; G06F 3/0421; G06F 2203/04109; G06F 3/0412; G06F 3/042; G06F 3/0428; G06K 9/0004
USPC ..................... 345/173–175; 178/18.03, 18.09
See application file for complete search history.

(56) References Cited

U.S. PATENT DOCUMENTS

| | | | | |
|---|---|---|---|---|
| 2008/0122803 | A1* | 5/2008 | Izadi et al. ................... | 345/175 |
| 2011/0032213 | A1* | 2/2011 | Pienimaa et al. ............. | 345/175 |
| 2012/0274590 | A1* | 11/2012 | Liu et al. ...................... | 345/173 |

* cited by examiner

*Primary Examiner* — Alexander Eisen
*Assistant Examiner* — Abhishek Sarma
(74) *Attorney, Agent, or Firm* — Morris Manning & Martin LLP; Tim Tingkang Xia, Esq.

(57) ABSTRACT

An optical touch panel includes a light source unit and a processing unit, wherein the processing unit is for executing a brightness control method. The brightness control method includes steps below. The light source unit emits at a first intensity in a touch control mode. Responding to a switching condition, the touch panel is switched into a scan mode, and the light source unit emits at a second intensity in the scan mode.

16 Claims, 10 Drawing Sheets

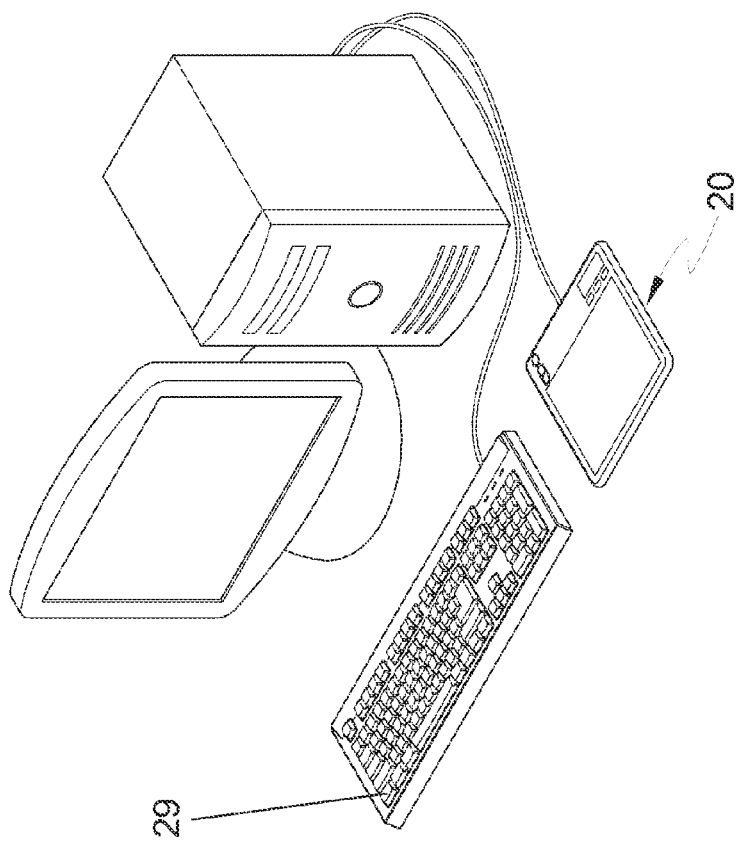
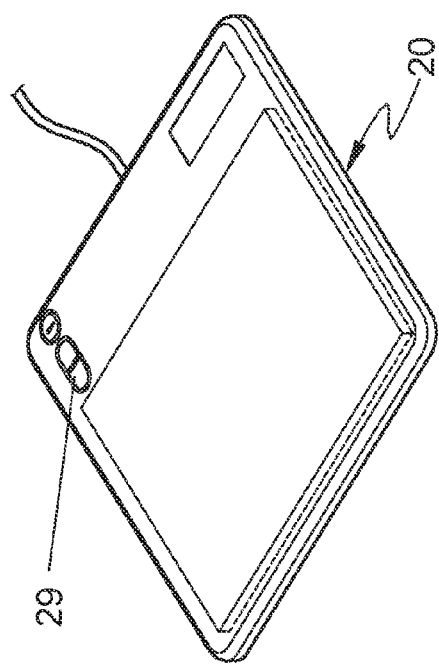

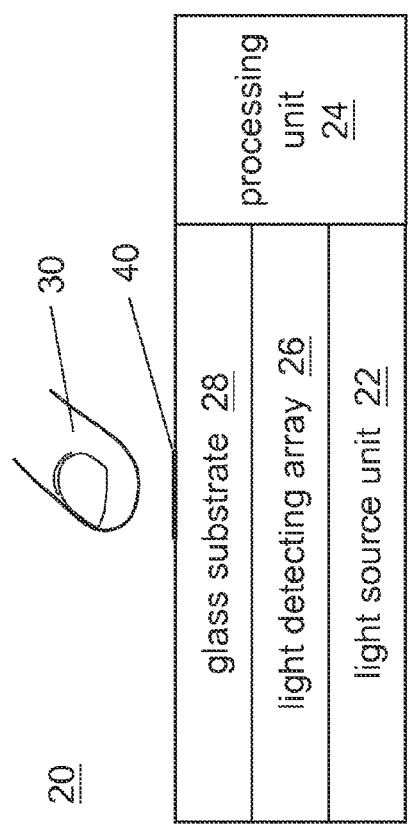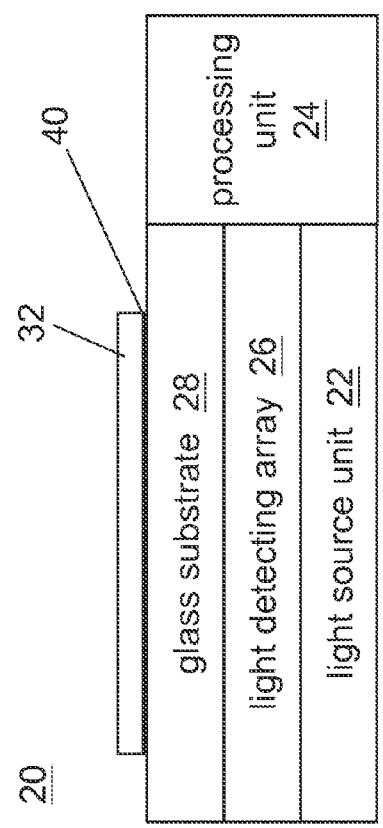
FIG.4
FIG.5

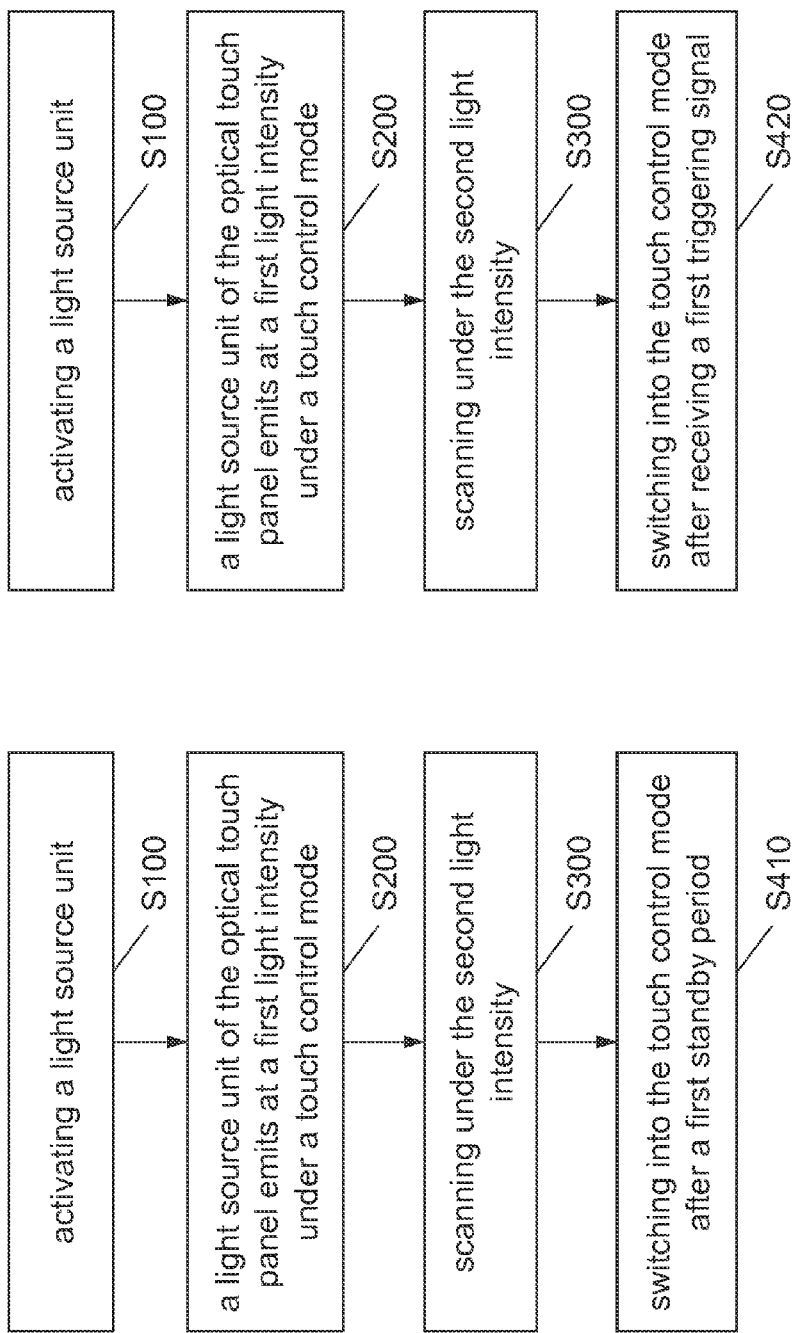

OPTICAL TOUCH PANEL AND BRIGHTNESS CONTROL METHOD THEREOF

CROSS-REFERENCE TO RELATED APPLICATIONS

This non-provisional application claims priority under 35 U.S.C. §119(a) on Patent Application No(s). 101135935 filed in Taiwan, R.O.C. on Sep. 28, 2012, the entire contents of which are hereby incorporated by reference.

TECHNICAL FIELD

The disclosure relates to an optical touch panel and brightness control method thereof, and more particularly to a various mode of an optical touch panel and brightness control method thereof.

BACKGROUND

In recent years, the touch panel or touch screen have been developed and used widely. According to the different types of operation, the touch panel has resistive type, capacitive type, or optical type etc. Among them, the optical touch sensor can be configured on the touch panel such that the display screen can be used as an input area at the same time. The touch panel with the optical touch sensor includes a light detector and a light source that can emit light from the touch panel. When an object is placed on the touch panel, the light emitted by the light source is blocked at the region where the object is placed, wherein part of the light is reflected by the object and then enters the light detector. The touch panel is capable to realize the object existing in which part of the region by sensing the reflected light.

The optical touch panel is further integrated into a device which can scan object image. Therefore, the touch panel has touching and scanning function. However, in order to obtain a sufficiently clear object image, the scanning function requires a strong light source. Therefore, the light source of the touch panel must emit sufficient intensity.

In other words, the optical touch panel with scan function must have a greater light source comparing to the normal operation optical touch panel.

The touch panel function does not need a light source having high intensity. Therefore, the optical touch panel with scan function will waste a lot of electricity without scanning Furthermore, if the touch panel is configured on a portable electronic device, the electric power consumption of the touch panel case will affect the time that portable electronic device being used. In addition, if the light source of the touch panel emits visible light, the user will feel the strong light that is harsh to the eye and feel uncomfortable.

SUMMARY

In view of the above, the disclosure provides an optical touch panel and a brightness control method. The optical touch panel includes a light source unit and a processing unit. The light source unit emits light at a first light intensity or a second light intensity selectively. The processing unit processes the method for controlling the brightness of the optical touch panel.

The brightness control method of the optical touch panel processes in the following orders. A light source unit of the optical touch panel emits at a first light intensity in a touch control mode. Detection of an intensity of the light emitted by the first light source is performed. The touch panel is switched into a scan mode in response to the detected intensity. The light source unit is enabled to emit at a second light intensity in the scan mode.

In conclusion, the optical touch panel comprises a touch control mode and a scan mode. The processing unit processes can switch the light intensity of the light source according to different mode. Therefore, the optical touch panel and the brightness control method can reduce the light intensity besides the scan mode so as to save power.

BRIEF DESCRIPTION OF THE DRAWINGS

FIG. 3A is a schematic diagram of a first mode switching key to the disclosure;

FIG. 3B is a schematic diagram of a first mode switching key to the disclosure;

FIG. 4 is a schematic diagram of a shadow area to the disclosure;

FIG. 5 is a schematic diagram of a shadow area to the disclosure;

FIG. 6 is a flow chart of a brightness control method of an optical touch panel according to the disclosure;

FIG. 7 is a flow chart of a brightness control method of an optical touch panel according to the disclosure;

DETAILED DESCRIPTION

The detailed features and advantages of the disclosure are described below in great detail through the following embodiments, the content of the detailed description is sufficient for those skilled in the art to understand the technical content of the present disclosure and to implement the disclosure there accordingly. Based upon the content of the specification, the claims, and the drawings, those skilled in the art can easily understand the relevant objectives and advantages of the disclosure.

The disclosure provides an optical touch panel and a brightness control method, wherein the optical touch panel comprises a touch control mode and a scan mode at the same time.

Figure 1A:
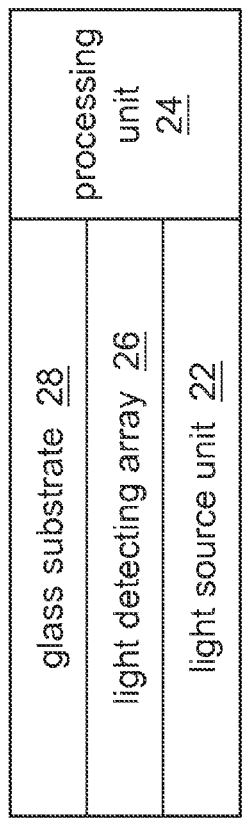
FIG. 1A is a schematic diagram of an optical touch panel according to the disclosure.
Figure 1B:
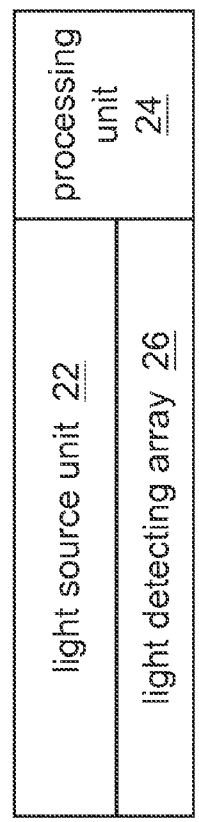
FIG. 1B is a schematic diagram of an optical touch panel according to the disclosure.

Referring to FIG. 1A and FIG. 1B, FIG. 1A and FIG. 1B are different schematic diagram of the optical touch panel separately. The optical touch panel 20 includes a light source unit 22, a processing unit 24, and a photo detecting array 26. The optical touch panel 20 includes a display function or does not have a display function. It is not limited in the disclosure. The optical touch panel 20 with display function can be used as a touch screen, which can be applied for displaying text, pictures, images, and other information. The optical touch panel 20 can obtain energy from a built-in battery or external power supply, wherein the external power supply can be battery or commercial power.

The optical touch panel 20 applies a light source unit 22 in backlight-type as shown in FIG. 1A. The optical touch panel 20 has a light source unit 22 in front-light type as shown in FIG. 1B. If a light source unit 22 in backlight-type is applied, an additional glass substrate is configured in front of the photo detecting array 26 in the optical touch panel 20, in order to protect the photo detecting array 26 and the light source unit 22.

The mechanisms of the light source unit 22 in backlight-type and in front-light type are different. The mechanisms are destructing total reflection in front-light type and simply reflecting image in backlight-type.

The light source unit 22 emits light toward the lightning side of the optical touch panel (that is, the direction toward the glass substrate 28 in FIG. 1A or the opposite direction toward the photo detecting array 26 in FIG. 1B). The photo detecting array 26 detects the incident light (also referred to as ambient light) injected into the optical touch panel or detect the light emitted by the light source unit 22 and reflected into the optical touch panel 20 light so as to output an output signal. Furthermore, the optical touch panel 20 includes a drive unit, a light guide plate or a reflecting plate according to the design.

The optical touch panel 20 is connected to a computer, and the optical touch panel 20 has at least a touch mode and a scan mode. For example, a desktop computer, server, tablet PC, mobile phone, camera or video game is an option for the computer At the touch mode, the user can operate the optical touch panel 20 by the finger or a touch pen so as to control a cursor of the computer. At the scan mode, it is capable to scan the object configured on the optical touch panel 20 and outputs the scanning result. For example, the scan mode includes a scanning business card mode and a scanning fingerprint mode. The scanning business card mode can be used to scan the business card and store the results in the computer. The scanning fingerprint mode is available for the computer to scan the user's fingerprint so as to determine whether the user is a legitimate user of the computer. If so, the computer will be unlocked or turned on.

The light source unit 22 emits the light by a first light source intensity or a second light source intensity according to the modes selectively. In other words, the light source unit 22 can at least emit light in two different intensities. In the touch mode, the processing unit 24 only needs to determine whether there is at least one shelter formed on the surface of the optical touch panel 20 by the photo detecting array 26. Therefore, the requirement for the output signal of the photo detecting array 26 is lower, and the light source unit 22 only needs a first light source intensity emitted at a weaker status. However, in order to obtain a sufficiently clear scan results at the scan mode, the light source unit 22 emits in the second light source intensity at a greater status in order to ensure the intensity of the output signal of the photo detecting array 26 is sufficient. In another condition, the light source unit 22 emits the light at the first light source intensity at a greater status to overcome the interference of ambient light in the touch mode, and emits the light at the second light source intensity at a weaker status in the scan mode. There are different light source modes in different situation as mentioned above. The control method of the optical touch panel is proposed that more than two kinds of the light source intensity are designed in two different modes.

Figure 2:
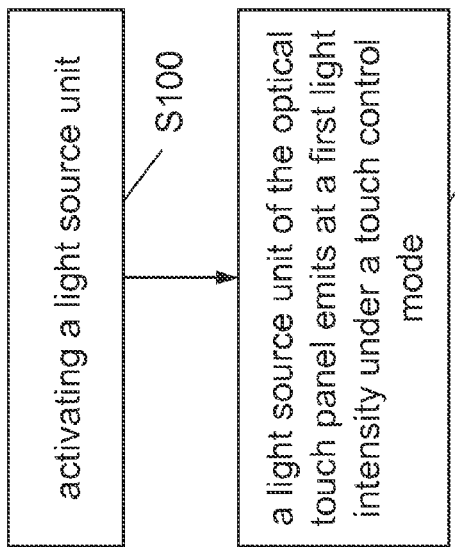
FIG. 2 is a flow chart of a brightness control method of an optical touch panel according to the disclosure.

The processing unit 24 can receive the signal outputted by the photo detecting array 26 in order to implement the brightness control method of the optical touch panel, and control the light source unit 22 and the operation of the photo detecting array 26. Please refer to FIG. 2 for the brightness control method of the optical touch panel; it refers to the flow chart of the brightness control method of the optical touch panel.

The optical touch panel 20 can be preset at the touch control mode while being activated. Therefore, after the optical touch panel 20 is activated, the processing unit 24 instruct the light source unit 22 of the optical touch panel 20 emits light at the first light source intensity at the touch control mode of the optical touch panel 20 (step S100). Next, the processing unit 24 determines whether the optical touch panel 20 conforms to a switching condition or not. If the switching condition is conformed, the processing unit 24 responds to the switching condition and switches to the scan mode of the optical touch panel 20, and instructs the light source unit 22 to emit light at the second light source intensity (step S200).

Figure 3C:
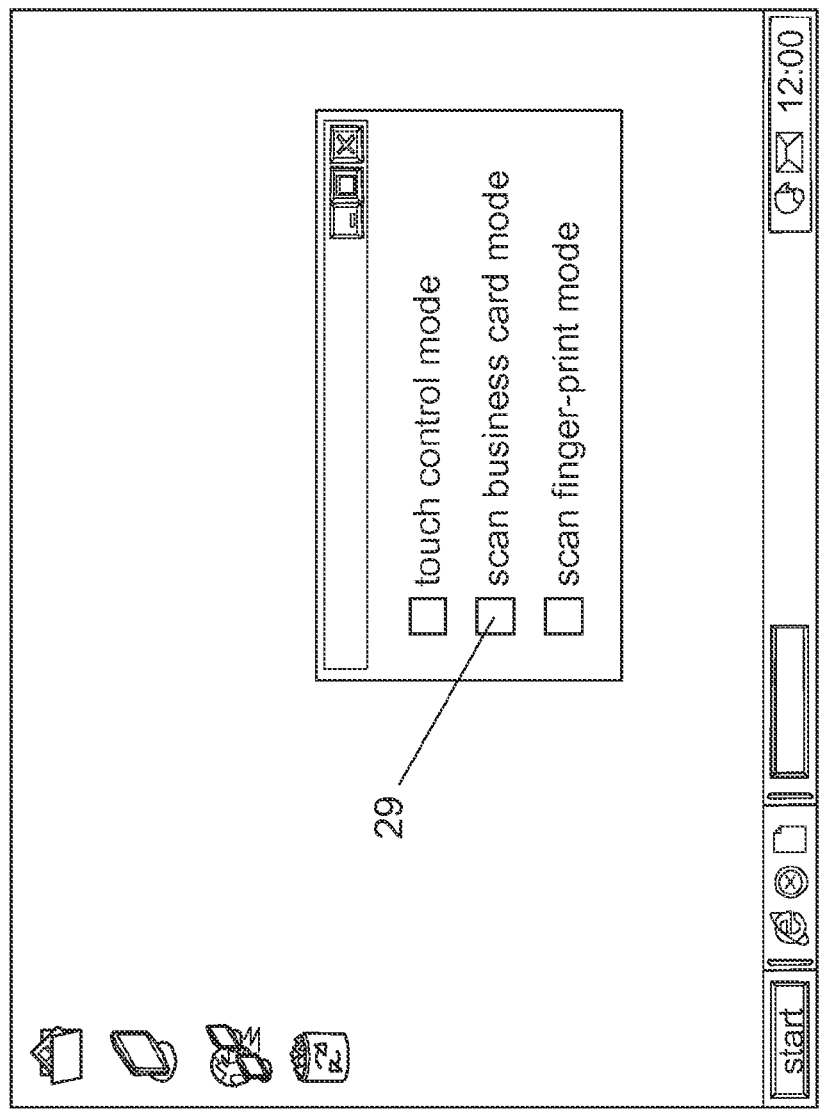
FIG. 3C is a schematic diagram of a first mode switching key to the disclosure.

According to an embodiment, the switching condition is configured to be receiving a first trigger signal. The optical touch panel 20 itself or a peripheral device connected to the computer is configured with a first mode switching key 29 as shown in FIG. 3A and FIG. 3B. The user can press the first mode switching key 29 so as to switch the optical touch panel 20 to the scan mode. In addition, the screen can also display a virtual switch button as the first mode switching key 29 by a software for the user to trigger by clicking the mouse or the optical touch panel 20 as shown in FIG. 3C. When the first mode switching key 29 is triggered, a first trigger signal is generated. When the processing unit 24 receives the first trigger signal, it is switched to a scan mode and requests the light source unit 22 emitting at the second light source intensity.

According to another embodiment, the switching condition is configured to be based on a wide area shadow on the optical touch panel formed by the light with first light source intensity, which is emitted by the first light source and reflected. Comparing to the shadow area 40 (as shown in FIG. 4) sheltered by the finger (shelter 30) of the user, the shadow area 40 (as shown in FIG. 5) sheltered by a business card 32 is obviously larger. In the embodiment, the processing unit 24 processes a detection procedure at a fixed time interval to determine whether the shadow area 40 is formed on the optical touch panel 20 and the area of the shadow area 40 is greater than a threshold value or not. The shadow area 40 can cover a wide range of shadow pixels. If the number of the shadow pixels is greater than the threshold value, the shadow area 40 can be considered as a wide area shadow and conform to the switching condition.

In addition, if a ratio of the shadow pixels accounted for the total number of the pixels are greater than the threshold value, the shadow area 40 can be considered as a wide area shadow and conform to the switching condition, wherein the total number of the pixels refers to the pixel numbers contained in the entire optical touch panel 20, for example, 800×600=480000.

The optical touch panel 20 can perform scan function after switching into scan mode, and then switched back to touch control mode. Please refer to FIG. 6, which is the flow chart of the brightness control method of the optical touch panel. After the step S200, the processing unit 24 scans under the second light source intensity (step S300). After a first standby period, it can switch into the touch control mode (step S410). In other words, when the scan process is completed, the processing unit switches into the touch control mode and request the optical touch panel 20 to emit light at first light source intensity. The time period of the scanning business card mode and scanning fingerprint mode of the scan mode corresponds to different length of the first standby period.

According to another embodiment, different first standby period can be set for each mode. The light source unit 22 continues to emit at the corresponding light source intensity during the first standby period, and shut down or switch to the first light source intensity automatically before the first standby period ends.

Please refer to FIG. 7, which is the flow chart of the brightness control method of the optical touch panel for another embodiment. After the processing unit 24 scans at the second light source intensity (step S300), the second trigger signal being received is determined. The optical touch panel 20 itself or a peripheral device connected to the computer is configured with a second mode switching key. The user can press the second mode switching key so as to switch the optical touch panel 20 to the scan mode. In addition, the screen can also display a virtual switch button as the second mode switching key by software for the user to trigger by clicking the mouse or the optical touch panel 20. When the second mode switching key is triggered, a second trigger signal is generated. When the processing unit 24 receives the second trigger signal, it is switched to the touch control mode (step S420) and requests the light source unit 22 emitting at the first light source intensity. However, according to another embodiment, the user can also press the first mode switching key 29 to switch the optical touch panel 20 back to the touch control mode.

In order to increase the energy efficiency of the optical touch panel 20, the brightness control method of the optical touch panel can detect the ambient light, and turn off the light source unit 22 automatically. Please refer to FIG. 8 and FIG. 9, which is the flow chart of the brightness control method of the optical touch panel for an embodiment, and the schematic diagram of the optical touch panel. In the embodiment, the array of photo detecting array 26 of the optical touch panel 20 includes a plurality of visible light detector 27 so as to detect ambient light.

In order to save power, the light source unit 22 can be reset to turn off. That is to say, even if the optical touch panel 20 is activated, the light source unit 22 is still maintained at turning off status. After the optical touch panel 20 is activated, the processing unit 24 processes a detection procedure at a fixed time interval to identify whether the optical light emitting on the optical touch panel is sheltered (step S510) so as to generate any shadow area 40. When the ambient light emitted on the optical touch panel 20 is shielded, indicating that the user wants to operate. The processing unit 24 activates the light source unit 22 (step S100) to the touch mode, so as to enable the light source unit 22 of the optical touch panel 20 to emit at the first light source intensity lighting (step S200). Next, the processing unit 24 determines whether the output signal of the photo detecting array 26 in a second standby period changes or not (step S520). When the output signal of the photo detecting array 26 in the second standby period does not change, meaning the optical touch panel 20 has been inactivated such that the light source unit 22 can be turn off (step S530) in order to save energy.

If the output signal of the photo detecting array 26 in a second standby period is changed, it can determine whether the optical touch panel 20 conforms to a switching condition (step S540) and switches from a touch mode to a scan mode. If the switching condition is conformed, the processing unit 24 responds to the switching condition and switches to the scan mode of the optical touch panel 20, and instructs the light source unit 22 to emit light at the second light source intensity (step S550), and scan at the second light source intensity (step S300). If the switching condition is not conformed, the optical touch panel 20 is maintained at the touch mode. After the scanning has passed the first standby or the second trigger signal is received (step S560), the processing unit 24 can switch back to the touch mode.

It should be noted that since the photo detecting array 26 includes a visible light sensor 27a. Therefore, the photo detecting array 26 is able to detect whether any shelter 30 generates the shadow area 40 by using the ambient light when the light source unit 22 is closed. However, in addition to the visible light sensor 27a, the photo detecting array 26 also includes a plurality of invisible light sensor 27b. In one embodiment, the light source unit 22 comprises at least one non-visible light emitting unit or further includes at least one visible light-emitting unit. The above-described non-visible can be infrared or ultraviolet for example.

In addition, although the embodiments the optical touch panel 20 of the above example only comprises the touch mode and the scan mode, the optical touch panel 20 is configured to have other modes besides the touch mode and the scan mode. The processing unit 24 is configured to set different light source intensity according to different modes, and change the light intensity of the light source unit 22 according to the mode switching in order to avoid unnecessary expensive.

Figure 8:
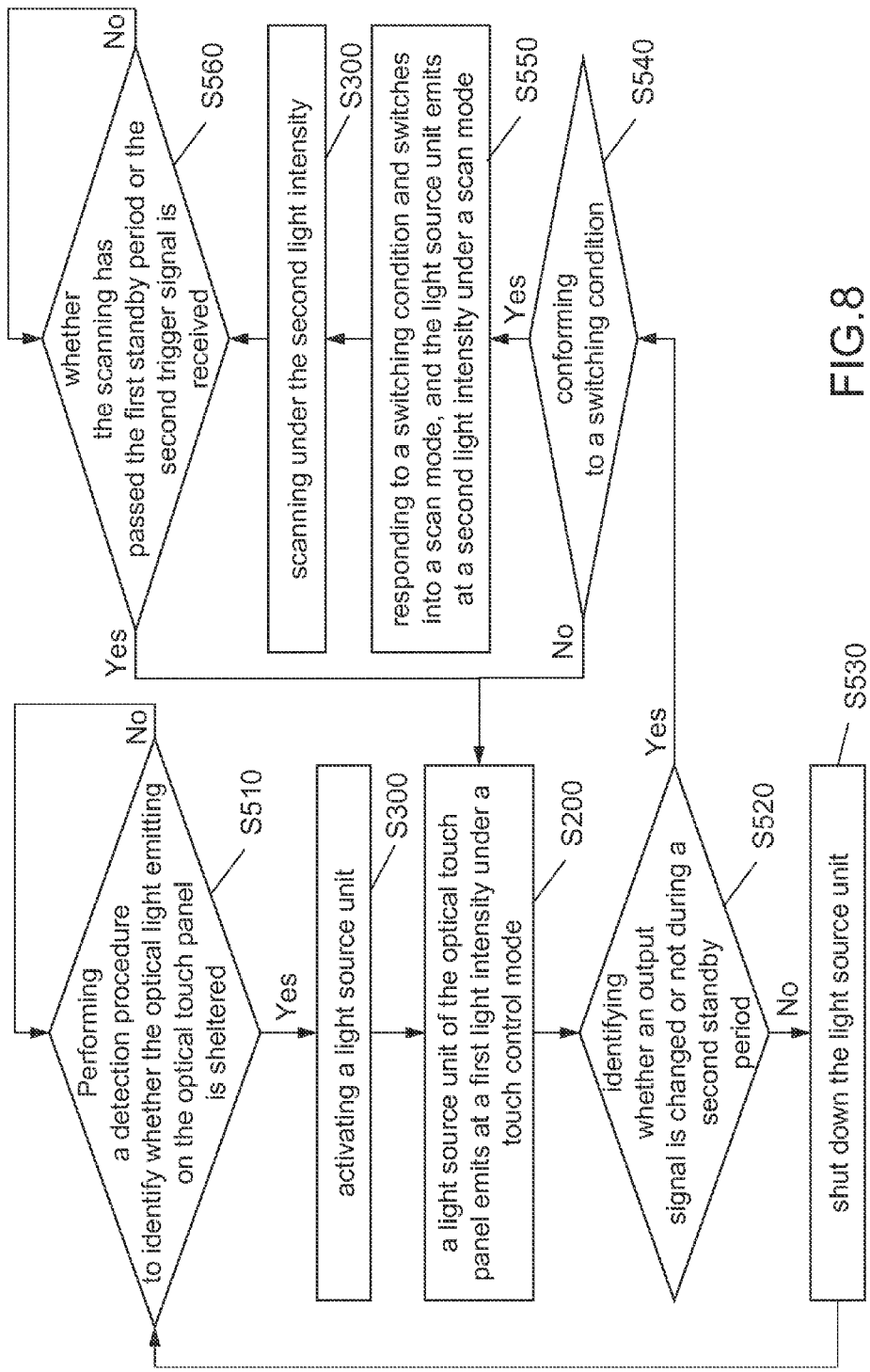
FIG. 8 is a flow chart of a brightness control method of an optical touch panel according to the disclosure.
Figure 9:
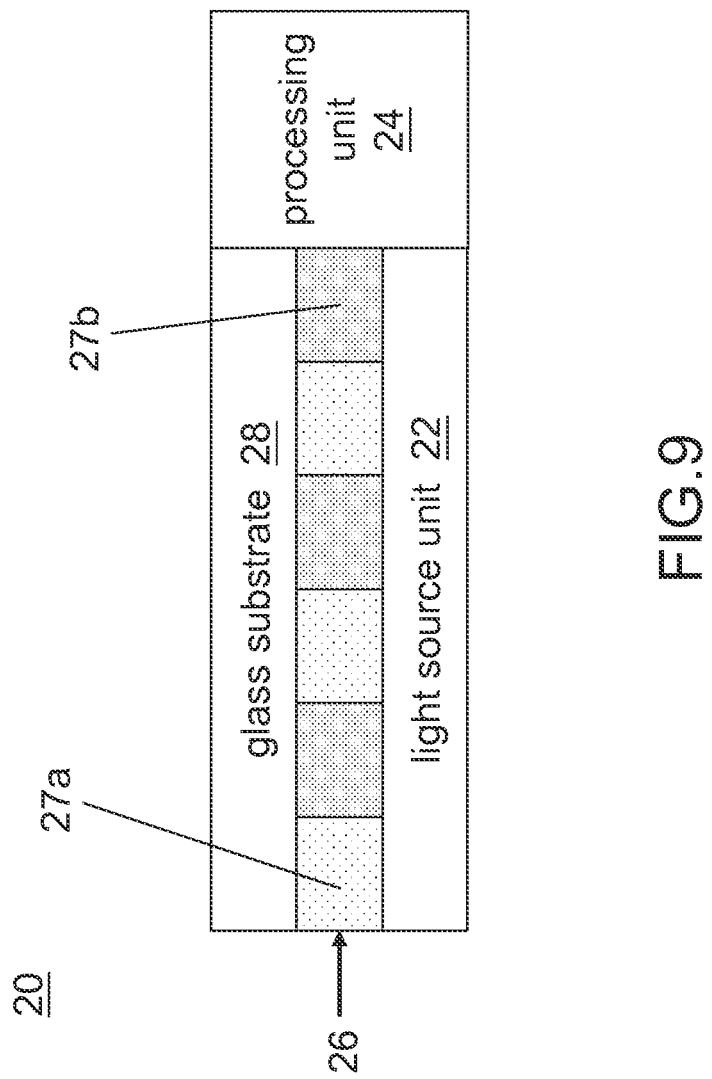
FIG. 9 is a schematic diagram of an optical touch panel according to the disclosure.
Figure 12:
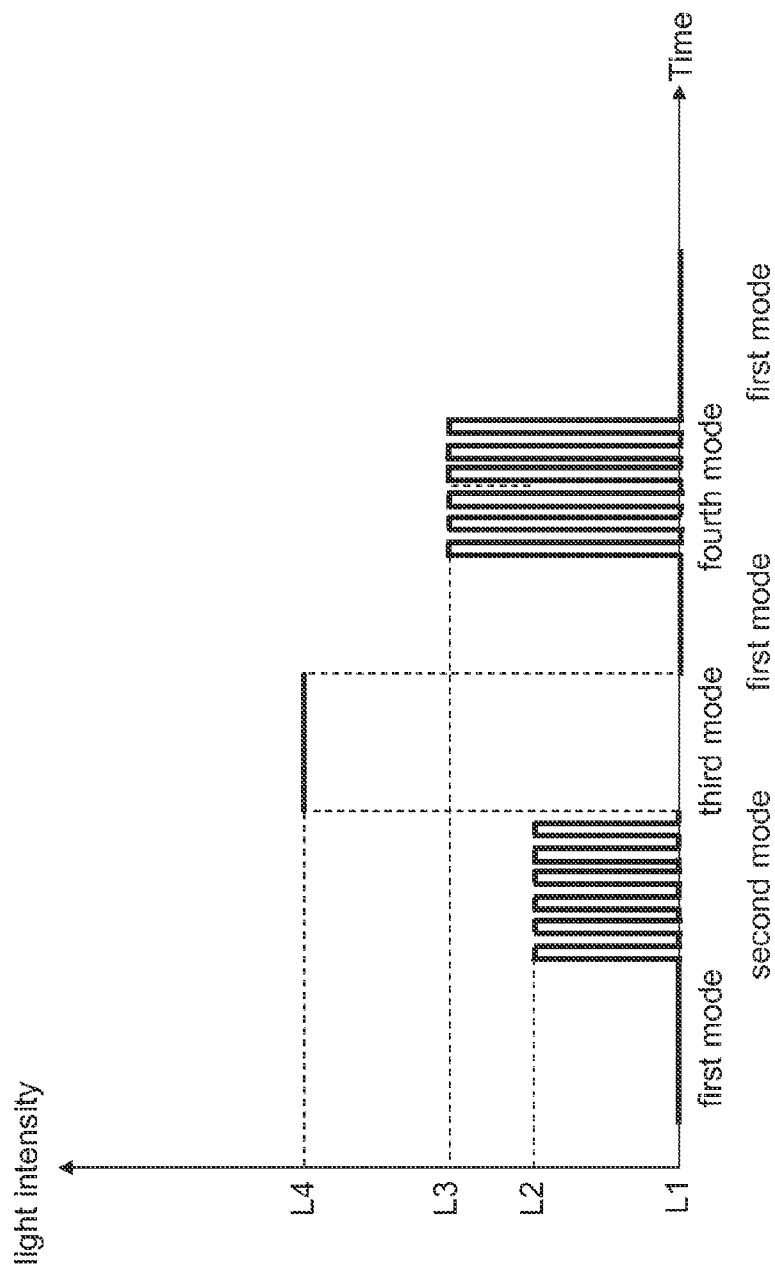
FIG. 12 is a schematic diagram of light source intensity according to the disclosure.

FIG. 8, FIG. 9, and FIG. 12 are the schematic diagram of the light source intensity for different embodiments. Assuming the optical touch panel 20 includes a first mode, a second mode, a third mode, and a fourth mode, each mode corresponds to a different light intensity L1, L2, L3 and L4. The first mode corresponds to the light source unit 22 at closed state, the second mode, the third mode, and the fourth mode corresponds to the touch mode, the scan mode, and the fingerprint scan mode mentioned above while the luminance of the light source intensity are L1<L2<L4<L3.

When the optical touch panel 20 is just activated, it can be maintained in the first mode until the ambient light emitted to the optical touch panel 20 is shielded and enter to the second mode, such that the light source unit 22 emits at the light source intensity L2. When the user needs to scan business card 32, it can switch into a third mode such that the light source unit 22 emits at the light source intensity L3. If the user does not need to use the optical track panel 20 after scanning business card 32, the user can turn off the power of the light source unit 22 and switch back to the first mode. When the user wants to use the fingerprint scanning function to turn on the computer, the user can switch to the fourth mode. If the optical touch panel 20 is not being used after the fingerprint scanning during the first standby period, it can switch back to the second mode to save power automatically. Afterwards, if the output signal in the second standby period is not changed, it can switch back to the first mode in order to further save power automatically.

Figure 10:
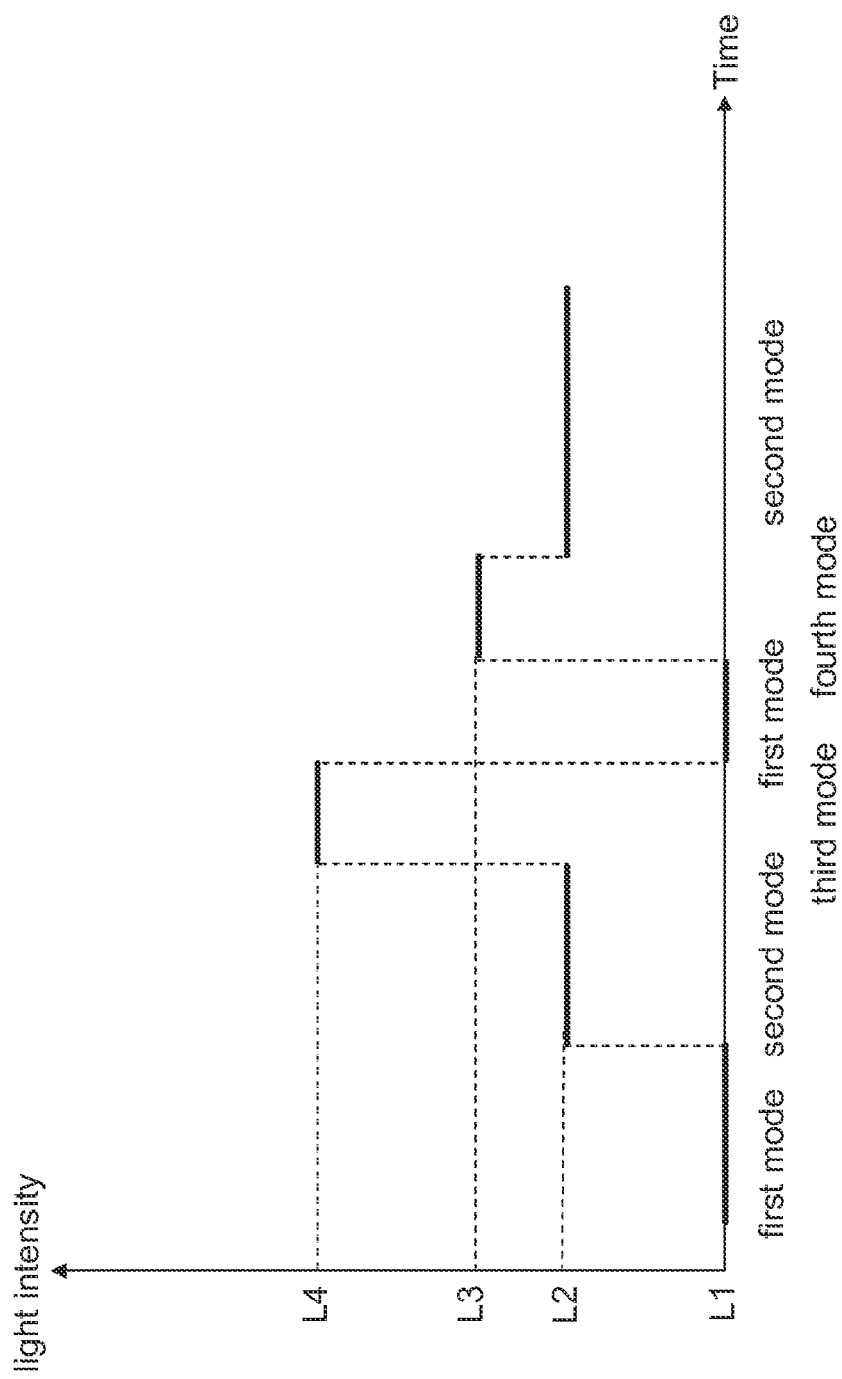
FIG. 10 is a schematic diagram of light source intensity according to the disclosure.
Figure 11:
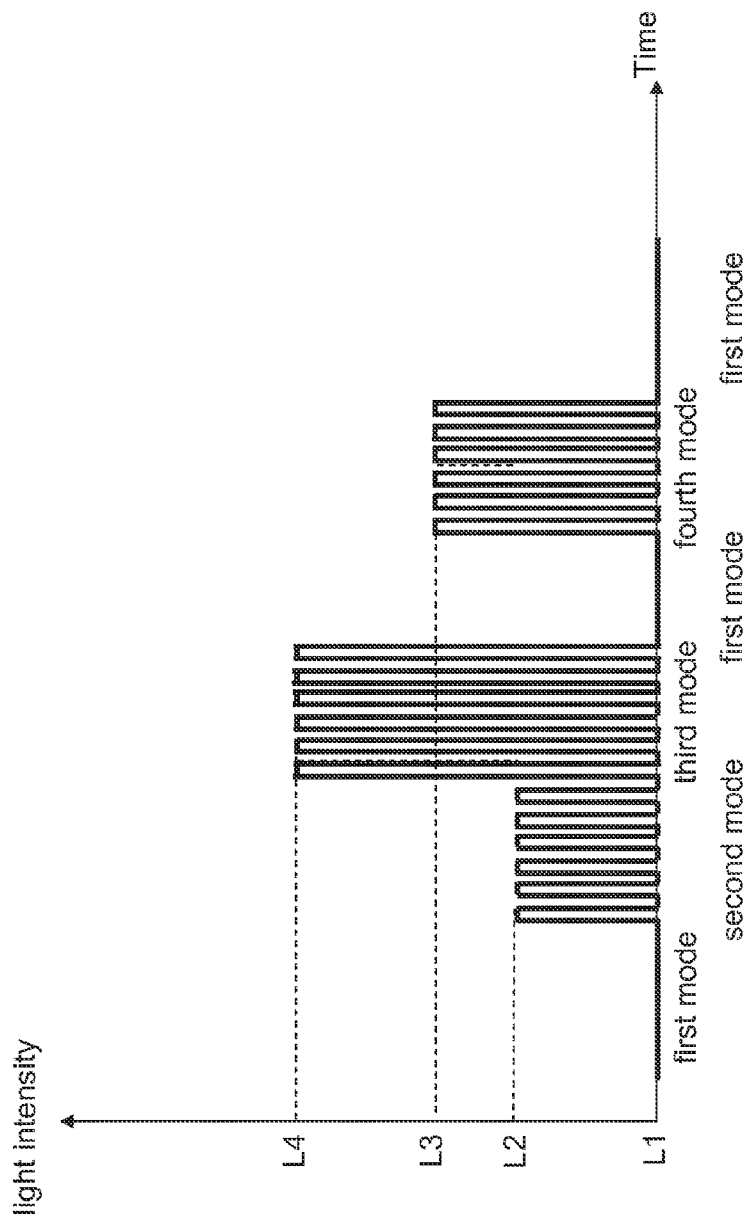
FIG. 11 is a schematic diagram of light source intensity according to the disclosure.

For each mode, the light source unit 22 emits light at a step driving mode, such as FIG. 10. The light source unit 22 also is configured to emit light at a pulse driving (or impulse driving) mode, such as FIG. 11. Furthermore, the light source unit 22 can also emit light by mixing the step driving mode and the pulse driving mode, but only in a specific mode to drive by pulse, such as FIG. 12

In conclusion, for the single optical touch panel with the touch function and the scan function, the processing unit can switch the intensity of the light emitted by the light source unit according to the operating mode. Therefore, the light source unit does not need to emit the strong light at the scan mode in the touch control mode issue enough to scan glare so as to save power. If the optical touch panel includes visible light detector, the optical touch panel can further being turn off or turn on automatically based on the ambient light being sheltered or not, so as to save energy.

Furthermore, the second light source intensity can only be emitted at the scan mode. Therefore, if the touch panel is configured on a portable electronic device, the time that portable electronic device being used will be longer. In addition, if the light source of the touch panel emits visible light, the user will no longer feel the strong light that is harsh to the eye and feel uncomfortable While the present invention has been shown and described in connection with the exemplary embodiments, it will be apparent to those skilled in the art that modifications and variations can be made without departing from the spirit and scope of the invention as defined by the appended claims.

What is claimed is:

1. A brightness control method of an optical touch panel, comprising:
   enabling a light source unit of the optical touch panel to emit at a first light intensity in a touch control mode;
   detecting an intensity of the light emitted by the first light source;
   switching the touch panel into a scan mode in response to the detected intensity; and
   enabling the light source unit to emit at a second light intensity in the scan mode,
   wherein a switching condition is based on the light emitted by the first light source intensity that is reflected so as to form a wide area shadow on the optical touch panel, and the wide area shadow covers a plurality of shadow pixels, and numbers of the shadow pixels are greater than a threshold value or a ratio of the shadow pixels accounted for a total number of the pixels are greater than the threshold value.

2. The brightness control method according to claim 1, wherein the second light intensity is greater than the first light intensity.

3. The brightness control method according to claim 1, wherein after the step of responding to the switching condition and switching the touch panel into the scan mode, and enabling the light source unit to emit at the second light intensity in the scan mode, the brightness control method further comprises:
   scanning under the second light intensity; and
   switching into the touch control mode after a first standby period.

4. The brightness control method according to claim 1, wherein after the step of responding to the switching condition and switching the touch panel into the scan mode, and enabling the light source unit to emit at the second light intensity in the scan mode, the brightness control method further comprises:
   scanning under the second light intensity; and
   switching into the touch control mode after receiving a first triggering signal.

5. The brightness control method according to claim 1, wherein before the step of enabling a light source unit of the optical touch panel to emit at a first light intensity in a touch control mode, the brightness control method further comprises:
   performing a detection procedure to identify whether optical light emitting on the optical touch panel is sheltered;
   activating the light source unit when the optical light emitting on the optical touch panel is sheltered.

6. The brightness control method according to claim 5, wherein after the step of enabling a light source unit of the optical touch panel to emit at a first light intensity in a touch control mode, the brightness control method further comprises:
   identifying whether an output signal is changed or not during a second standby period;
   turning off the light source unit when the output signal is not changed during the second standby period.

7. The brightness control method according to claim 1, wherein the switching condition is receiving a first triggering signal.

8. An optical touch panel, comprising:
   enabling a light source unit to emit light at a first light intensity or a second light intensity selectively, wherein the second light intensity is different from the first light intensity; and
   processing a processing unit in the following steps:
      enabling a light source unit of the optical touch panel to emit at a first light intensity in a touch control mode; and
      responding to a switching condition and switching the touch panel into a scan mode, and enabling the light source unit to emit at a second light intensity in the scan mode,
   wherein the switching condition is based on the light emitted by the first light source intensity that is reflected so as to form a wide area shadow on the optical touch panel, and the wide area shadow covers a plurality of shadow pixels, and numbers of the shadow pixels are greater than a threshold value or a ratio of the shadow pixels accounted for a total number of the pixels are greater than the threshold value.

9. The optical touch panel according to claim 8, wherein the second light intensity is greater than the first light intensity.

10. The optical touch panel according to claim 8, wherein after the step of responding to the switching condition and switching the touch panel into the scan mode, and enabling the light source unit to emit at the second light intensity in the scan mode, the processing unit is further processed in the following steps:
    scanning under the second light intensity; and
    switching into the touch control mode after a first standby period.

11. The optical touch panel according to claim 8, wherein after the step of responding to the switching condition and switching the touch panel into the scan mode, and enabling the light source unit to emit at the second light intensity in the scan mode, the processing unit is further processed in the following steps:
    scanning under the second light intensity; and
    switching into the touch control mode after receiving a first triggering signal.

12. The optical touch panel according to claim 8, wherein before the step of enabling a light source unit of the optical touch panel to emit at a first light intensity in a touch control mode, the processing unit is further processed in the following steps:
    performing a detection procedure to identify whether optical light emitting on the optical touch panel is sheltered;
    activating the light source unit when the optical light emitting on the optical touch panel is sheltered.

13. The optical touch panel according to claim 12 further comprising:
    a photo detector array, comprising a plurality of visible light detectors, and the photo detector array is applied for sensing light and outputting an output signal.

14. The optical touch panel according to claim 13, wherein after the step of enabling the light source unit of the optical touch panel to emit at the first light intensity in a touch control mode, the processing unit is further processed in the following steps:
- identifying whether an output signal is changed or not during a second standby period;
- turning off the light source unit when the output signal is not changed during the second standby period.

15. The optical touch panel according to claim 8, wherein the switching condition is receiving a first triggering signal.

16. The optical touch panel according to claim 8 further comprising:
- a photo detector array, comprising at least one visible light detector or one non-visible light detector, and the photo detector array is applied for sensing light and outputting an output signal.

\* \* \* \* \*